(12) United States Patent
La Valle

(10) Patent No.: US 12,421,734 B1
(45) Date of Patent: Sep. 23, 2025

(54) DRYWALL BOARD

(71) Applicant: Joseph La Valle, Redding, CT (US)

(72) Inventor: Joseph La Valle, Redding, CT (US)

( * ) Notice: Subject to any disclaimer, the term of this patent is extended or adjusted under 35 U.S.C. 154(b) by 311 days.

(21) Appl. No.: 18/127,067

(22) Filed: Mar. 28, 2023

(51) Int. Cl.
| | | |
|---|---|---|
| *E04F 13/14* | (2006.01) |
| *B32B 3/26* | (2006.01) |
| *B32B 27/30* | (2006.01) |
| *B32B 29/00* | (2006.01) |
| *C04B 28/14* | (2006.01) |
| *C04B 41/48* | (2006.01) |
| *C04B 41/63* | (2006.01) |
| *E04F 13/08* | (2006.01) |
| *E04F 13/18* | (2006.01) |
| *C04B 111/00* | (2006.01) |

(52) U.S. Cl.
CPC .............. *E04F 13/14* (2013.01); *B32B 3/266* (2013.01); *B32B 27/304* (2013.01); *B32B 29/002* (2013.01); *C04B 28/14* (2013.01); *C04B 41/4838* (2013.01); *C04B 41/63* (2013.01); *E04F 13/0866* (2013.01); *E04F 13/0871* (2013.01); *E04F 13/18* (2013.01); *B32B 2255/12* (2013.01); *B32B 2255/20* (2013.01); *B32B 2307/546* (2013.01); *B32B 2307/748* (2013.01); *B32B 2607/00* (2013.01); *C04B 2111/00629* (2013.01)

(58) Field of Classification Search
CPC . B32B 3/266; B32B 29/002; B32B 2307/546; B32B 2607/00; B32B 3/00; B32B 5/00; B32B 7/00; B32B 2305/00; E04F 13/0866; E04F 13/0871; C04B 2111/00629; B27D 5/00; B27H 1/00
See application file for complete search history.

(56) References Cited

U.S. PATENT DOCUMENTS

| | | | | |
|---|---|---|---|---|
| 3,084,403 | A | * | 4/1963 | Elmendorf .......... E04F 13/0801 428/167 |
| 3,386,221 | A | | 6/1968 | Giovannucci |
| 4,201,025 | A | | 5/1980 | Williamson |
| 4,206,267 | A | * | 6/1980 | Jungbluth .................. B32B 3/28 428/626 |
| 4,326,631 | A | * | 4/1982 | Annand .................. E04D 11/02 52/631 |
| 5,170,603 | A | | 12/1992 | Bartlett |
| 5,875,596 | A | | 3/1999 | Muller |
| 6,502,357 | B1 | | 1/2003 | Stuthman |

(Continued)

FOREIGN PATENT DOCUMENTS

CA 2352556 1/2002

*Primary Examiner* — Patrick J Maestri
(74) *Attorney, Agent, or Firm* — Kyle A. Fletcher, Esq.

(57) ABSTRACT

The PVC drywall board is configured for use in construction. The PVC drywall board is used to form a non-load bearing surface in a structure under construction. The PVC drywall board is intended to replace traditional drywall. The PVC drywall board is a flexible structure. The flexible structure of the PVC drywall board allows the PVC drywall board to be stored as a scroll before the deployment of the PVC drywall board for installation as a non-load bearing surface of the structure under construction. The PVC drywall board includes a kerf bending, a textured coating, and a barrier structure. The textured coating is sandwiched between the kerf bending and the barrier structure.

13 Claims, 6 Drawing Sheets

(56) References Cited

U.S. PATENT DOCUMENTS

| | | | |
|---|---|---|---|
| 6,871,686 B2 * | 3/2005 | Eshpar | E04F 10/08 160/133 |
| D746,487 S | 12/2015 | Bilge | |
| 2002/0002804 A1 | 1/2002 | Sheehy | |
| 2009/0130389 A1 * | 5/2009 | Whitaker | B32B 3/16 156/247 |
| 2015/0375343 A1 * | 12/2015 | Chapman | B32B 3/263 428/167 |

* cited by examiner

FIG. 6
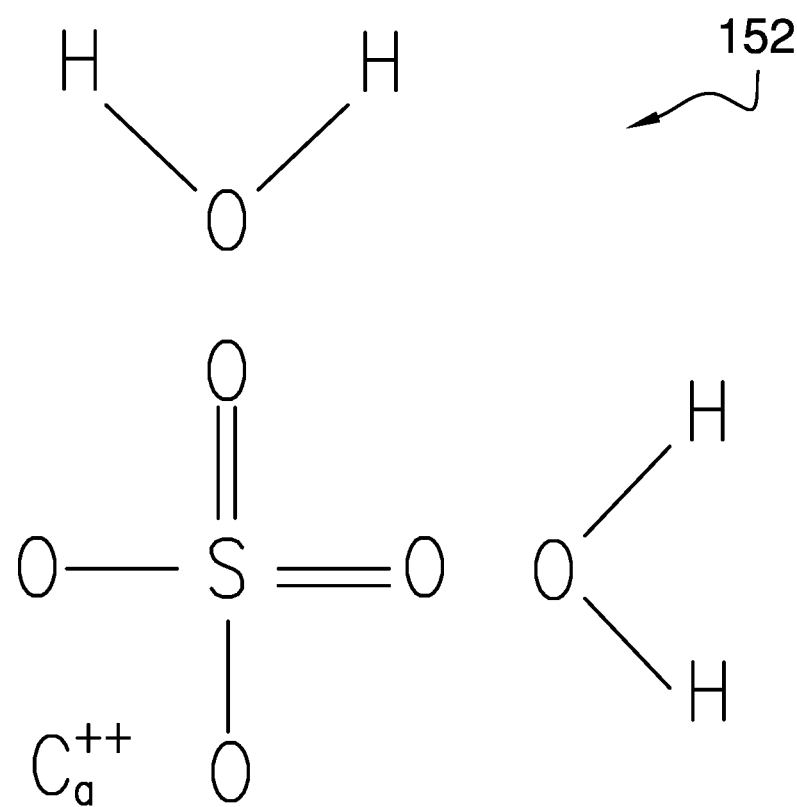
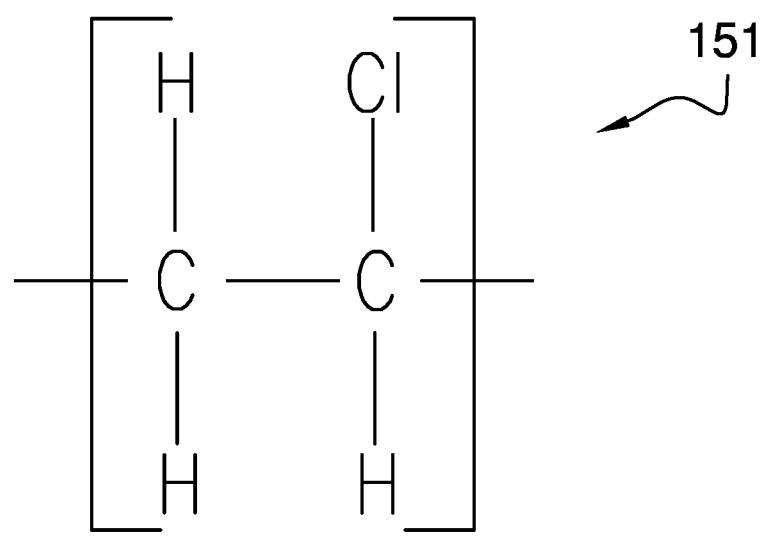

DRYWALL BOARD

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of coverings and linings for walls and ceilings composed as a composite of multiple layers. (E04F13/0875)

SUMMARY OF INVENTION

The PVC drywall board is configured for use in construction. The PVC drywall board is used to form a non-load bearing surface in a structure under construction. The PVC drywall board is intended to replace traditional drywall. The PVC drywall board is a flexible structure. The flexible structure of the PVC drywall board allows the PVC drywall board to be stored as a scroll before the deployment of the PVC drywall board for installation as a non-load bearing surface of the structure under construction. The PVC drywall board comprises a kerf bending, a textured coating, and a barrier structure. The textured coating is sandwiched between the kerf bending and the barrier structure.

These together with additional objects, features and advantages of the PVC drywall board will be readily apparent to those of ordinary skill in the art upon reading the following detailed description of the presently preferred, but nonetheless illustrative, embodiments when taken in conjunction with the accompanying drawings.

In this respect, before explaining the current embodiments of the PVC drywall board in detail, it is to be understood that the PVC drywall board is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the PVC drywall board.

It is therefore important that the claims be regarded as including such equivalent construction insofar as they do not depart from the spirit and scope of the PVC drywall board. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 6 is a detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
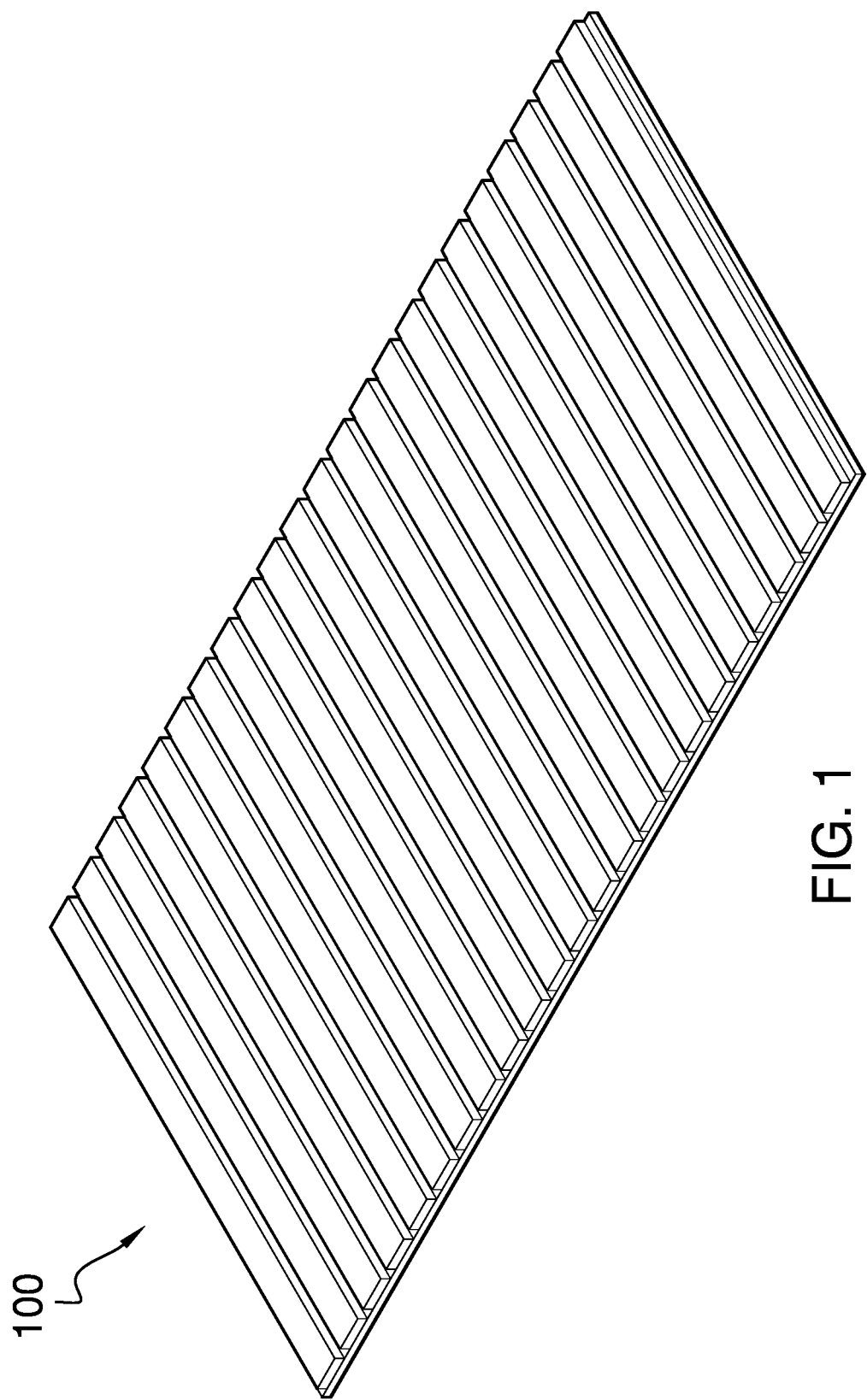
FIG. 1 is a perspective view of an embodiment of the disclosure.
Figure 2:
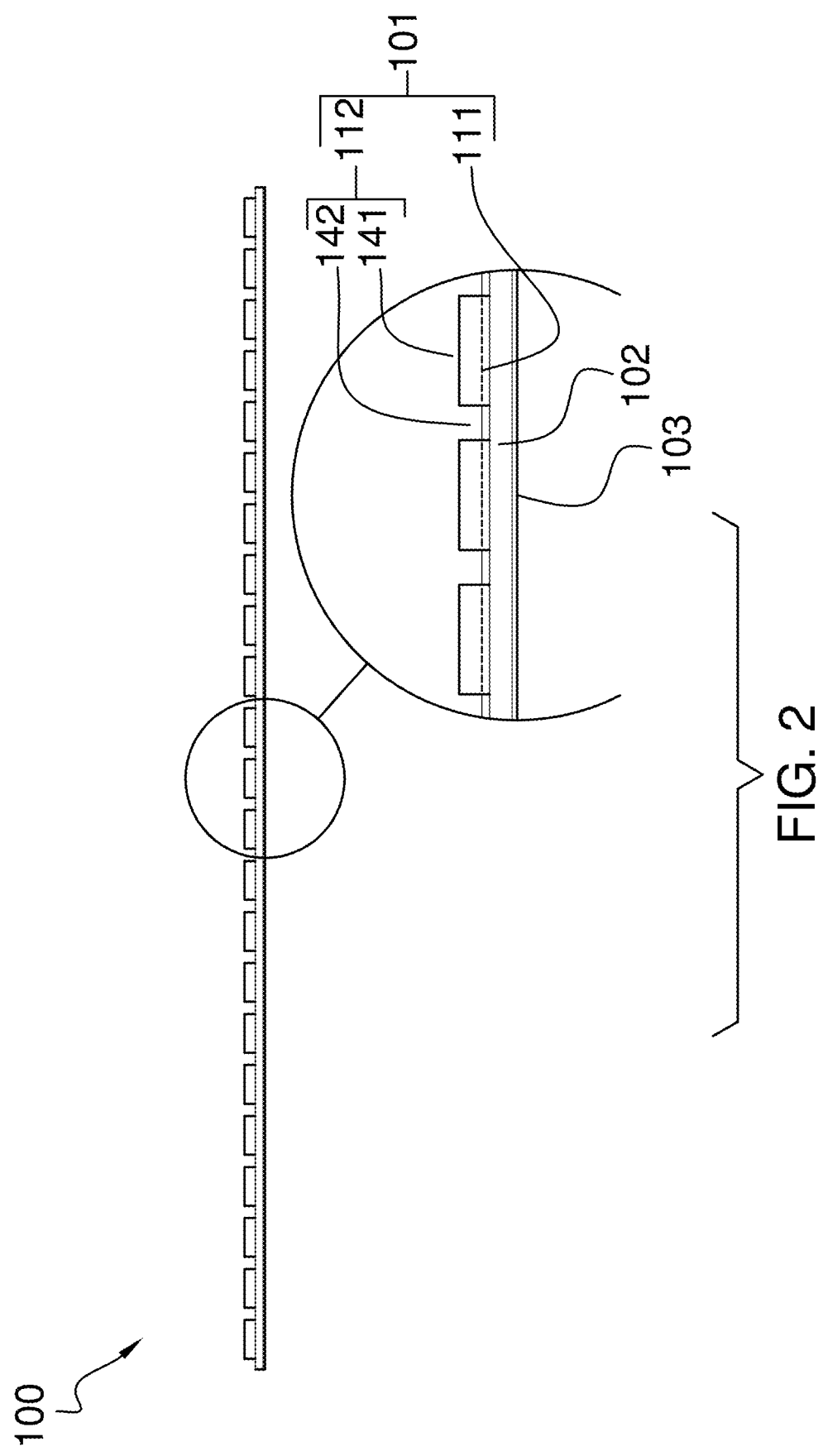
FIG. 2 is a side view of an embodiment of the disclosure.
Figure 3:
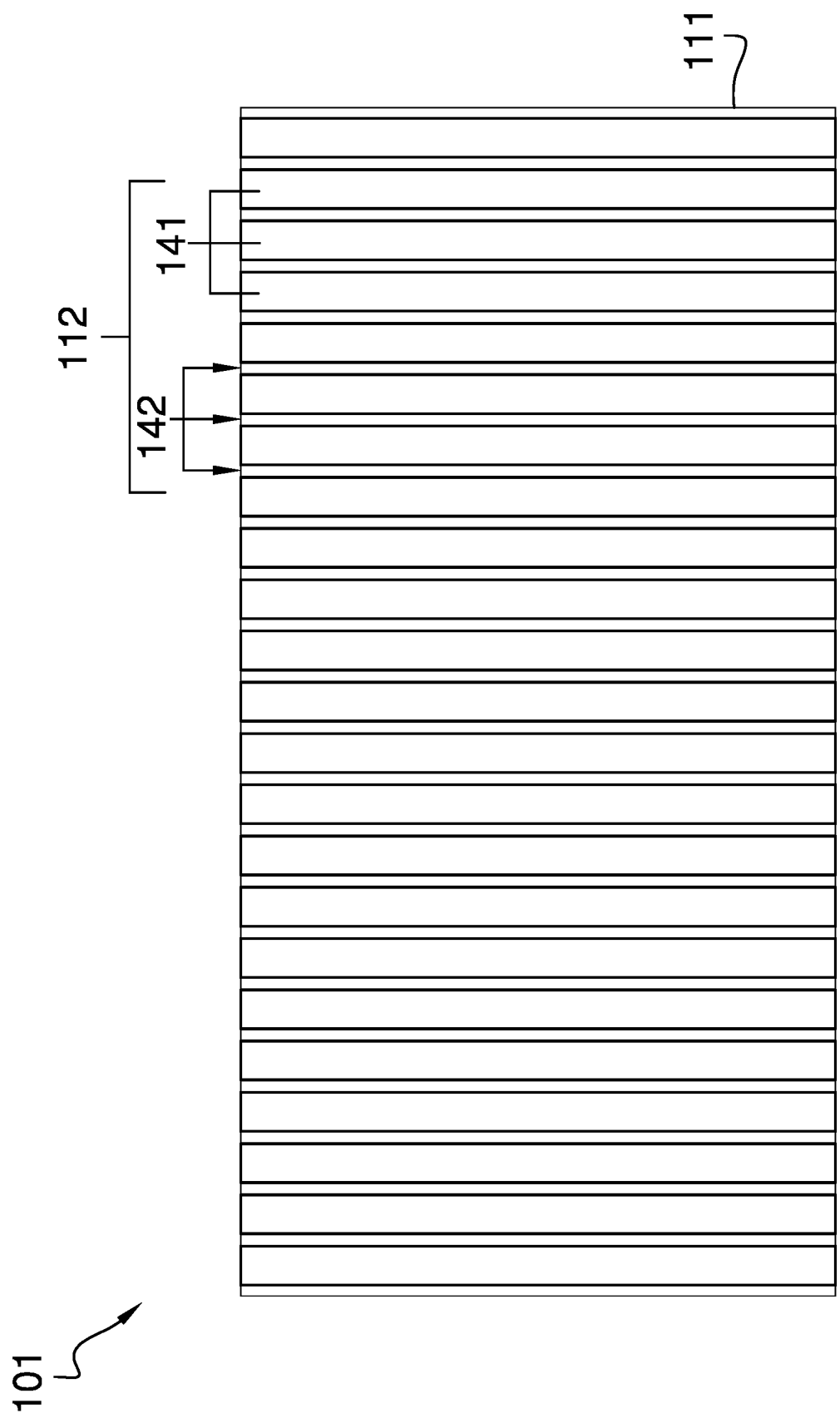
FIG. 3 is a rear view of an embodiment of the disclosure.
Figure 4:
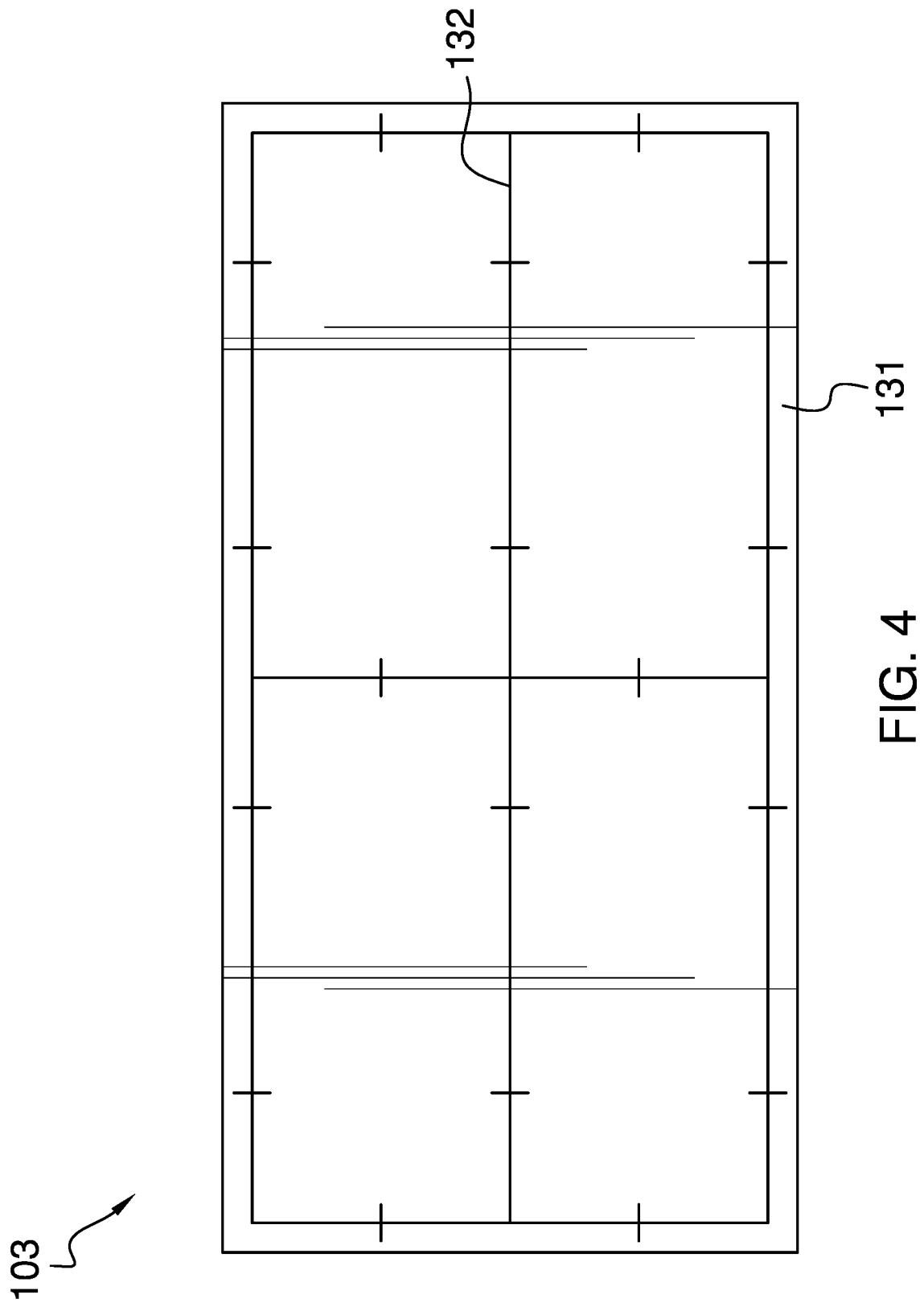
FIG. 4 is a front view of an embodiment of the disclosure.
Figure 5:
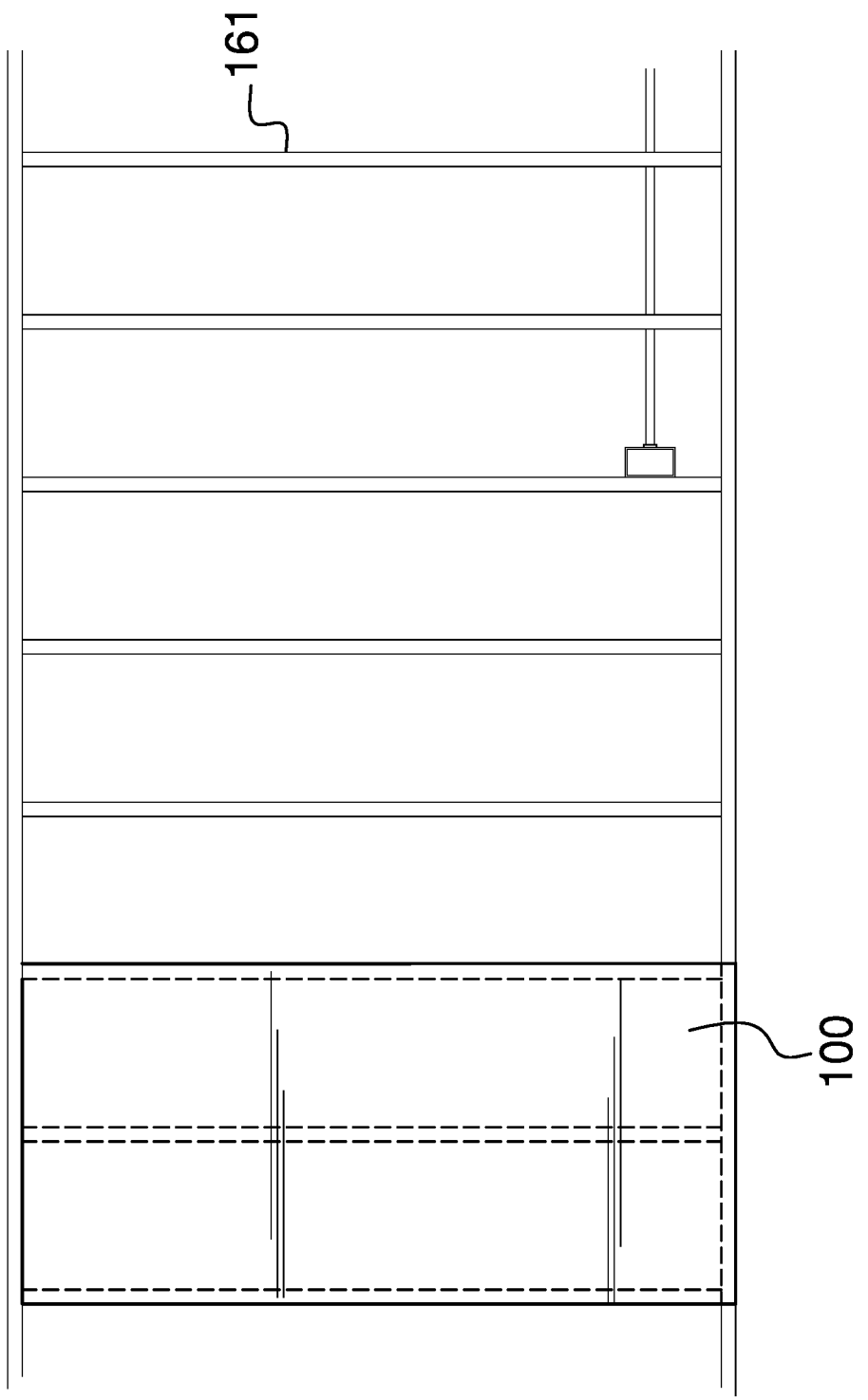
FIG. 5 is an in-use view of an embodiment of the disclosure.

Detailed reference will now be made to one or more potential embodiments of the disclosure, which are illustrated in FIGS. 1 through 5.

The PVC drywall board 100 (hereinafter invention) is configured for use in construction. The invention 100 is used to form a non-load bearing surface in a structure under construction 161. The invention 100 is intended to replace traditional drywall. The invention 100 is a flexible structure. The flexible structure of the invention 100 allows the invention to be stored as a scroll before the deployment of the invention 100 for installation as the non-load bearing surface of the structure under construction 161. The invention 100 comprises a kerf bending 101, a textured coating 102, and a barrier structure 103. The textured coating 102 is sandwiched between the kerf bending 101 and the barrier structure 103.

The kerf bending 101 forms the load bearing structure of the invention 100. The kerf bending 101 forms the primary shape of the invention 100. The kerf bending 101 is a disk shaped structure. The kerf bending 101 is a flexible structure. The kerf bending 101 is formed as a kerf bending 101. The kerf bending 101 is defined elsewhere in this disclosure. The kerf 8 bending 101 forms a sheeting structure that can be rolled into a scroll. The kerf bending 101 forms the load path that transfers the loads of the textured coating 102 and the barrier structure 103 to a structure under construction 161. The kerf bending 101 is fastened to the structure under construction 161. The kerf bending 101 comprises a base plate 111 and a slat structure 112. In the first potential embodiment of the disclosure, the kerf bending 101 comprises polyvinylchloride (CAS: 9006-86-2) 151. The polyvinylchloride (CAS: 9006-86-2) 151 is defined elsewhere in this disclosure.

The base plate 111 is a disk shaped structure. The base plate 111 is a flexible structure. The flexible nature of the base plate 111 allows the base plate 111 to be rolled into a scroll shape. In the first potential embodiment of the disclosure, the base plate 111 has a rectangular shape.

The slat structure 112 forms the living hinge structure of the kerf bending 101. The slat structure 112 mounts on the congruent end of the disk structure of the base plate 111 with the greatest surface area. The slat structure 112 mounts on the congruent end of the disk structure of the base plate 111 that is distal from the textured coating 102. The slat structure 112 enhances the load bearing strength of the kerf bending 101 while allowing the kerf bending 101 to be rolled into a scroll structure. The slat structure 112 further comprises a plurality of slats 141 and a plurality of slots 142.

Each slat selected from the plurality of slats 141 is a disk shaped structure. Each selected slat is a rectangular structure. Each selected slat mounts on the face of the base plate 111 with the greatest surface area. The plurality of slats 141 mount on the base plate 111 such that the major axis of any first slat selected from the plurality of slats 141 is parallel to any second slat selected from the plurality of slats 141. The slat selected from the plurality of slats 141 mount on the base plate 111 such that the major axis of each selected slat is parallel to an edge of the rectangular shape of the base plate 111. The plurality of slats 141 forms the physical surface of the base plate 111 that is proximal to the structure under construction 161.

Each slot selected from the plurality of slots 142 is a negative space that is formed between any first slat selected from the plurality of slats 141 and any second slat selected from the plurality of slats 141 that is adjacent to the first selected slat. The negative space formed by the selected slot forms a living hinge between the first selected slat and the second (adjacent) selected slat. The negative space formed by the selected slot allows the first selected slat to rotate relative to the second (adjacent) selected slot as the kerf bending 101 is rolled into a scroll. The combination of each living hinge formed by each slot selected from the plurality of slots 142 forms the kerf bending 101 structure of the slot selected from the plurality of slots 142.

The textured coating 102 is a coating that is applied to the congruent end base plate 111 of the kerf bending 101 that is distal from the slat structure 112 of the kerf bending 101. The textured coating 102 forms the visible surface of the invention 100 after the invention 100 is installed as a non-load bearing surface of the structure under construction 161. The textured 19 coating 102 is formed as a malleable structure that will conform to the changes of the surface of the kerf bending 101 as the kerf bending 101 is rolled into a scroll. The applicant prefers that the textured coating 102 creates the feel and appearance of a surface formed from calcium sulfate dihydrate (CAS: 10101-41-4) 152. In the first potential embodiment of the disclosure, the textured coating 102 comprises calcium sulfate dihydrate (CAS: 10101-41-4) 152. The calcium sulfate dihydrate (CAS: 10101-41-4) 152 is defined elsewhere in this disclosure.

The barrier structure 103 is a sheeting structure. The barrier structure 103 is a flexible structure. The barrier structure 103 is geometrically similar to the congruent ends of the disk structure of the kerf bending 101. The barrier 8 structure 103 is applied to the surface of the textured coating that is distal from the kerf bending 101. The barrier structure 103 forms the barrier structure 103 that creates a protected surface for the textured coating 102. The barrier structure 103 encloses the textured coating 102. The barrier structure 103 is a disposable structure. The barrier structure 14 is removed from the textured coating 102 after the invention has been installed in the structure under construction 161. The barrier structure 103 comprises a sheeting structure 131 and a sheeting image 132.

The sheeting structure 131 is the sheeting that encloses the textured coating 102 for storage. The sheeting structure 131 is formed from paper. The sheeting structure 131 removably encloses the exterior surface of the textured coating 102 that is applied to the kerf bending 101. The sheeting structure 131 is a disposable structure. The sheeting structure 131 is removed from the textured coating 102 after the invention 100 has been installed in the structure under construction 161. The sheeting structure 131 is a flexible structure. The flexible nature of the sheeting structure 131 allows the sheeting structure 131 to conform to the changes of the surface of the kerf bending 101 as the kerf bending 101 is rolled into a scroll.

The sheeting image 132 is a visible image. The sheeting image 132 is applied to the sheeting structure 131. The sheeting image 132 is visibly displayed from the face of the sheeting structure 131 that is distal from the textured coating 102. The sheeting image 132 is visible from the exterior of the invention 100. The sheeting image 132 presents one or more indicia. The one or more indicia presented by the sheeting image 132 is intended to stimulate a sentiment in an individual who sees the sheeting structure 131. The sheeting image 132 is disposed of with the sheeting structure 131. In the first potential embodiment of the disclosure, the sheeting image 132 presents a scale structure that allows the span of the distance between any two points on the congruent end of the disk structure of the base plate 111 to be estimated.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Boundary Structure: As used in this disclosure, a boundary structure is a barrier that separates a first object from a second object such that the second object cannot damage the first object.

Calcium Sulfate Dihydrate: As used in this disclosure, calcium sulfate dihydrate (CAS: 10101-41-4) is a hydrated form of calcium sulfate (CAS: 7778-18-9). The molecular formula for 14 calcium sulfate (CAS: 7778-18-9) is Ca2SO4. The molecular formula of calcium sulfate dihydrate (CAS: 10101-41-4) Ca2SO4-16 2H20. Calcium sulfate dihydrate (CAS: 10101-41-4) is commonly used in the manufacture of drywall. Calcium sulfate dihydrate (CAS: 10101-41-4) is often referred to as gypsum.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coating: As used in this disclosure, a coating refers to a substance that is applied to the exterior surface of an object such that the coating forms a new exterior surface of the object. A coating is commonly said to be formed as a layer. Paint is an example of a common coating material.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite: As used in this disclosure, composite refers to a two-dimensional or three-dimensional structure that is formed from two or more distinctly identifiable layered sub-structures.

Composite Material: As used in this disclosure, a composite material is a multilayer structure made of two or more joined layers of sheeting materials and coatings.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Disposable: As used in this disclosure, disposable is an adjective that refers to an object that is designed and intended for a single use. Within this context, an object would be considered disposable if it is not reusable after its initial use.

Drywall: As used in this material, drywall refers to a disk-shaped structure used to form a portion of a vertical surface commonly called a wall or a non-load bearing horizontal surface such as a ceiling.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Flexible: As used in this disclosure, flexible refers to an object or material that will deform when a force is applied to it but that will not necessarily return to its original shape when the deforming force is removed.

Flexure Bearing: As used in this disclosure, a flexure bearing is a thin and flexible material that is used to attach, or bind, a first object to a second object such that the first object can rotate in a controlled direction relative to the second object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition. See Label.

Indicia: As used in this disclosure, the term indicia refers to a set of markings that identify a sentiment. See sentiment.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Living Hinge: As used in this disclosure, a living hinge refers to a single object that is formed out of flexible material that is divided into a first segment, a second segment and the living hinge. The flexible nature of the flexible material allows the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major and minor axes intersect at the center of the structure. The major axis is always parallel to the longest edge of a rectangular structure.

Monomer: As used in this disclosure, a monomer refers to a molecular structure that bonds to itself in a repeating manner to form a polymer.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Paper: As used in this disclosure, paper refers to a sheeting material commonly used as: a) a substrate on which people write; b) a substrate on which images are displayed; and, c) wrapping or covering items. Paper is typically made from plant fibers such as cellulose. Paper intended for specific purposes may be made from other materials.

Pattern: As used in this disclosure, a pattern refers to a model, example, or image of an object of a process, object, or image that is duplicated. A process, object, or image is said to follow a pattern when the duplicated object appropriately resembles (or "follows") the pattern.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Polymer: As used in this disclosure, a polymer refers to a molecular chain that comprises multiple repeating units known as monomers. The repeating unit may be an atom or a molecular structure.

Polyvinylchloride: As used in this disclosure, polyvinylchloride (CAS: 9006-86-2) refers to a polymer formed from vinyl chloride (CAS: 75-01-4). The structure of vinyl chloride is $CH2=CClH$. The common abbreviation for polyvinylchloride is PVC.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Surface: As used in this disclosure, a protected surface is a surface that is separated from an environment by a boundary structure. The boundary structure forms a barrier that protects the protected surface from potential environmental dangers.

Relaxed Shape: As used in this disclosure, a structure is considered to be in its relaxed state when no shear, strain, or torsional forces are being applied to the structure.

Roll: As used in this disclosure, a roll is a method of storing paper or other sheeting as a cylindrical structure such that creases are not formed within the paper or sheeting. To form the roll, the paper or other sheeting material is curved over itself around a center axis such that a spiral is formed when the roll is viewed from the end of the cylindrical structure.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end. The verb to sandwich describes the act of placing the first disk-shaped structure between the second disk-shaped structure and the third disk-shaped structure.

Scale: As used in this disclosure, refers to a visual system of ordered markings that are used as a reference for measurement.

Scroll: As used in this disclosure, a scroll is a sheeting that is stored as a roll.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sentiment: As used in this disclosure, a sentiment refers to a symbolic meaning or message that is communicated through the use of an object or an image, potentially including a text based image. See image and optical character recognition.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Slat: As used in this disclosure, a slat is a strip of material that is a component of a larger plurality of slats that forms a structure. Any first slat either: 1) overlays one or more additional slats selected from the plurality of slats; or, 2) is aligned in some systemic manner with the remaining slats in the plurality of slats. The term slat is commonly used when working with venetian blinds and fences.

Strip: As used in this disclosure, the term describes a long and narrow object of uniform thickness that appears thin relative to the length of the object. Strips are often rectangular in shape. Strips often have a disk shape.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface that forms a boundary or barrier of a room or chamber.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A drywall board comprising
wherein the drywall board comprises a kerf bending, a textured coating, and a barrier structure;
wherein the textured coating is sandwiched between the kerf bending and the barrier structure;
wherein the barrier structure is a sheeting structure;
wherein the barrier structure is a flexible structure;
wherein the barrier structure is geometrically similar to congruent ends of the disk structure of the kerf bending;
wherein the barrier structure is applied to the surface of the textured coating that is distal from the kerf bending;
wherein the barrier structure forms a protected surface for the textured coating;
wherein the barrier structure encloses the textured coating;
wherein the barrier structure is removed from the textured coating after the drywall board has been installed in the structure under construction.

2. The drywall board according to claim 1
wherein the drywall board is used to form a non-load bearing surface in a structure under construction;
wherein the drywall board is a flexible structure;
wherein the flexible structure of the drywall board allows the drywall board to be stored as a scroll before the deployment of the drywall board for installation as the non-load bearing surface of the structure under construction.

3. The drywall board according to claim 2
wherein the kerf bending is a disk shaped structure;
wherein the kerf bending is a flexible structure.

4. The drywall board according to claim 3
wherein the kerf bending forms a sheeting structure that can be rolled into a scroll;
wherein the kerf bending forms a load path that transfers the loads of the textured coating and the barrier structure to a structure under construction;
wherein the kerf bending is fastened to the structure under construction.

5. The drywall board according to claim 4
wherein the textured coating is a coating that is applied to the kerf bending,
wherein the textured coating forms a visible surface of the drywall board after the drywall board is installed as a non-load bearing surface of the structure under construction;
wherein the textured coating is formed as a malleable structure that will conform to the changes of the surface of the kerf bending as the kerf bending is rolled into a scroll.

6. The drywall board according to claim 5
wherein the kerf bending comprises a base plate and a slat structure;
wherein the slat structure is formed on the base plate.

7. The drywall board according to claim 6
wherein the barrier structure comprises a sheeting structure and a sheeting image;
wherein the sheeting image is applied to the sheeting structure.

8. The drywall board according to claim 7
wherein the base plate is a disk shaped structure;
wherein the base plate is a flexible structure;
wherein a flexible nature of the base plate allows the base plate to be rolled into a scroll shape;
wherein the base plate has a rectangular shape.

9. The drywall board according to claim 8
wherein a slat structure forms a living hinge structure of the kerf bending;
wherein the slat structure mounts on a congruent end of the disk structure of the base plate with the greatest surface area;
wherein the slat structure mounts on the congruent end of the disk structure of the base plate that is distal from the textured coating;
wherein the slat structure enhances the load bearing strength of the kerf bending while allowing the kerf bending to be rolled into a scroll structure.

10. The drywall board according to claim 9
wherein the slat structure further comprises a plurality of slats and a plurality of slots;
wherein each selected slat is a rectangular structure;
wherein each selected slat mounts on a face of the base plate with the greatest surface area;
wherein the plurality of slats mount on the base plate such that a major axis of any first slat selected from the plurality of slats is parallel to any second slat selected from the plurality of slats;
wherein the slat selected from the plurality of slats mount on the base plate such that the major axis of each selected slat is parallel to an edge of a rectangular shape of the base plate;
wherein the plurality of slats forms a physical surface of the base plate that is proximal to the structure under construction;
wherein each slot selected from the plurality of slots is a negative space that is formed between any first slat selected from the plurality of slats and any second slat selected from the plurality of slats that is adjacent to the first selected slat;
wherein the negative space formed by the selected slot forms a living hinge between the first selected slat and the second (adjacent) selected slat;
wherein the negative space formed by the selected slot allows the first selected slat to rotate relative to the second (adjacent) selected slot as the kerf bending is rolled into a scroll;
wherein the combination of each living hinge formed by each slot selected from the plurality of slots forms the kerf bending structure of the slot selected from the plurality of slots.

11. The drywall board according to claim 3 wherein the textured coating is applied to a congruent end of the base plate of the kerf bending.

12. The drywall board according to claim 11
wherein a sheeting structure is the sheeting that encloses the textured coating for storage;
wherein the sheeting structure is formed from paper;
wherein the sheeting structure removably encloses the exterior surface of the textured coating that is applied to the kerf bending;
wherein the sheeting structure is removed from the textured coating after the drywall board has been installed in the structure under construction;
wherein the sheeting structure is a flexible structure;
wherein the flexible nature of the sheeting structure allows the sheeting structure to conform to the changes of the surface of the kerf bending as the kerf bending is rolled into a scroll.

13. The drywall board according to claim 12
wherein the sheeting image is a visible image;
wherein the sheeting image is visibly displayed from the face of the sheeting structure that is distal from the textured coating;
wherein the sheeting image is visible from the exterior of the drywall board;
wherein the sheeting image presents one or more indicia;
wherein the one or more indicia presented by the sheeting image is intended to stimulate a sentiment in an individual who sees the sheeting structure.

* * * * *